Feb. 8, 1949.   J. STUART, II   2,460,954
CUTTING MACHINE

Filed Sept. 5, 1945   2 Sheets-Sheet 1

JOSEPH STUART II
INVENTOR.

BY Cleveland B. Hallabaugh
ATTORNEY

Feb. 8, 1949.  J. STUART, II  2,460,954
CUTTING MACHINE
Filed Sept. 5, 1945  2 Sheets-Sheet 2

JOSEPH STUART II
*INVENTOR.*

BY Cleveland B. Hallabaugh
ATTORNEY

Patented Feb. 8, 1949

2,460,954

UNITED STATES PATENT OFFICE 2,460,954

CUTTING MACHINE

Joseph Stuart, II, Wilmington, Del., assignor, by mesne assignments, to the United States of America as represented by the Secretary of War Application September 5, 1945, Serial No. 614,547

7 Claims. (Cl. 164—48)

This invention relates to an automatic cutting machine for cutting preformed plastic material and, more particularly, for cutting sticks or bars of plastic material.

An object of the present invention is to provide a device readily adaptable to several types of presses for cutting plastic materials into slices of predetermined thickness.

A further object is to devise a novel mechanism for guiding and incrementally feeding at least one plastic stick or bar to a cutting device.

Other objects of the invention will appear hereinafter, the novel features and combinations being set forth in the appended claims.

Generally described, the present invention comprises a table adapted to support and guide preformed plastic material before the cutter, a cutter reciprocally actuated by a suitable mechanism such as a power press, a material-holding die situated directly adjacent to the path of travel of the cutter, a material-feeding mechanism with indexing control actuated synchonically with respect to the reciprocation of the cutter and apparatus designed to facilitate the control of the cutter actuating mechanism and the feeding mechanism.

A preferred embodiment of the invention has been chosen for purposes of illustration and description and is shown in the accompanying drawings forming a part of the specification, wherein reference symbols refer to like parts wherever they occur:

Figure 1:
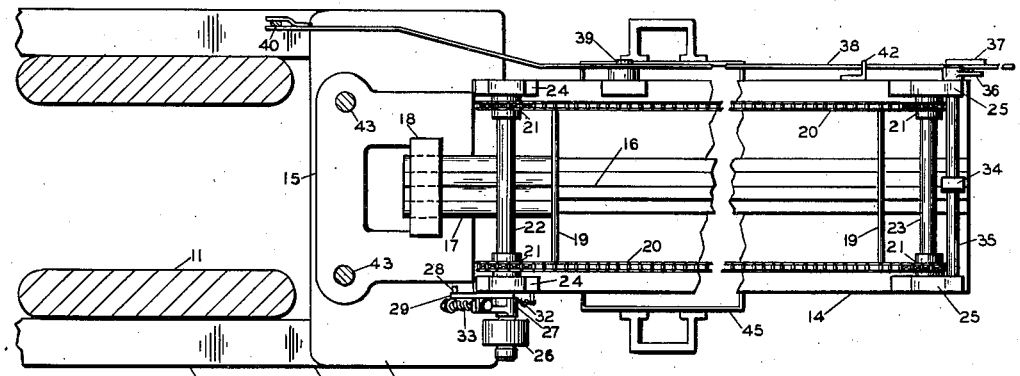
Fig. 1 is a fragmentary plan view of a preferred embodiment of the invention with the cutter and upper portion of the press removed substantially along the line 1—1 of Fig. 2.
Figure 2:
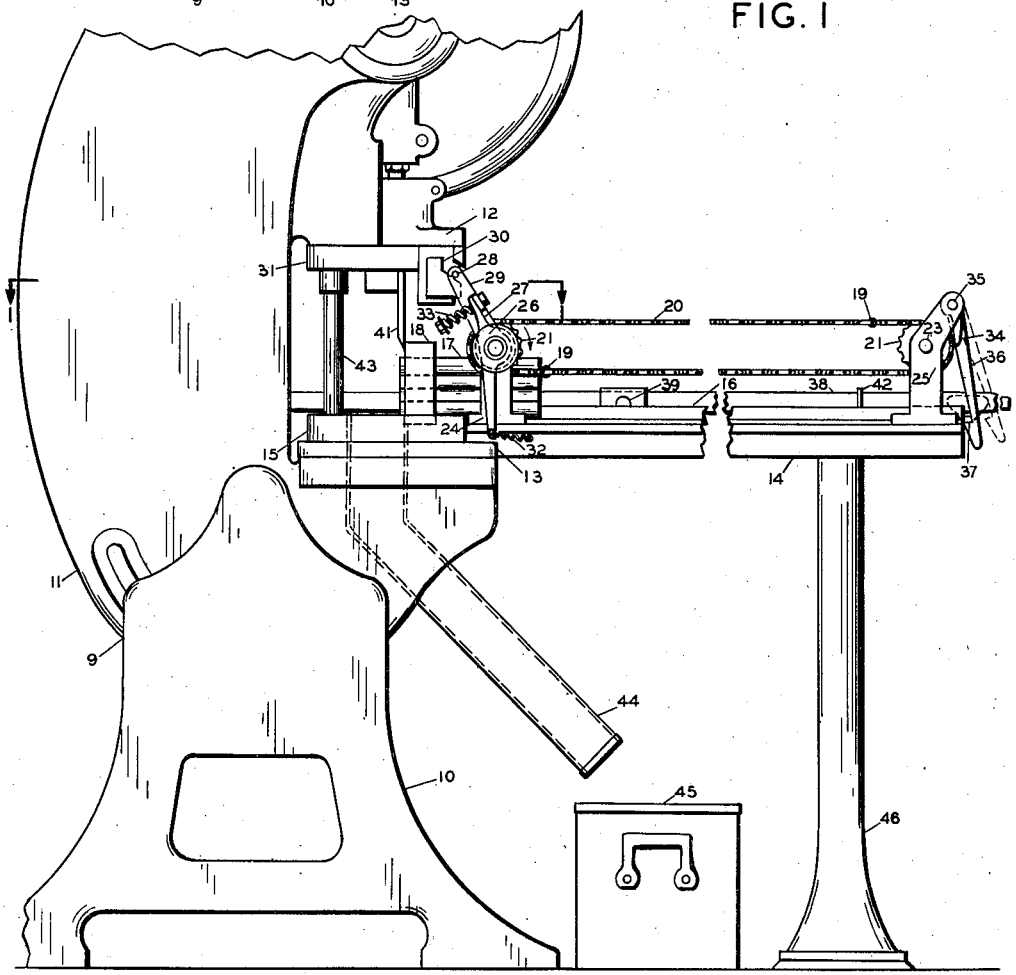
Fig. 2 is a side elevational view of the invention with the cutting mechanism in an elevated position.
Figure 3:
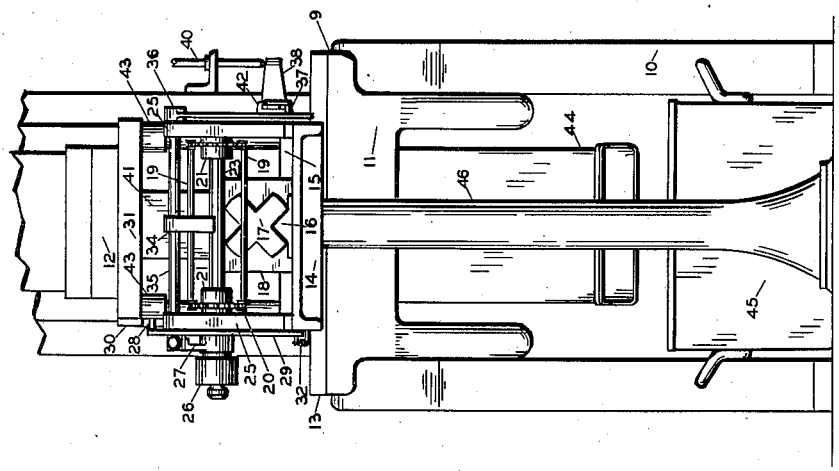
Fig. 3 is an end elevation as viewed from the right in Fig. 2.

In Figs. 1, 2, and 3, a press 9 of conventional type has a base 10 and column 11 forming a throat in which a ram 12 is vertically reciprocated. A bolster plate 13 supported by the column 11 is disposed beneath the ram 12 to form a suitable work space for the invention herein described.

A feed table 14, secured to the bolster plate 13 and in proper alignment with a lower platen 15 secured to the upper surface of bolster plate 13, serves as support and in conjunction with guide bar 16 as a guide to plastic stick 17 being fed through die 18. Die 18 is shown as designed for holding a cruciform plastic stick. The plastic 17 is incrementally pushed through the die 18 by push rod 19, suitably attached between the parallel strands of endless chains 20. The chains 20 are strung on sprockets 21 rigidly mounted in pairs on a front shaft 22 and on a rear shaft 23, which shafts are in turn mounted in rotatable manner in journals of front bearing posts 24 and rear bearing posts 25, respectively. The front shaft 22 is indexed in desired increments by suitable means, a preferred embodiment being the use of a one-way clutch 26 secured to an extension of front shaft 22 and incrementally actuated in the direction of the arrow in Fig. 2 by an attached spring lever 27. The motion of the spring lever 27 in the opposite direction indicated by the arrow in Fig. 2 would not be transmitted to the front shaft 22 by virtue of the operation of the one-way clutch 26, familiar to those skilled in the art. A cam follower 28 attached to a ratchet lever 29 follows the contour of a cam block 30 affixed to the upper platen 31. As the throw of the cam block 30 is contacted on the upstroke of the ram 12, motion is imparted to the one-way clutch 26 by the spring lever 27 in spring loaded attachment to the ratchet lever 29. The cam follower 28 is kept in contact with the cam block 30 by the constant tension exerted on the lower portion of the ratchet lever 29 by a tension spring 32, the fixed end of which is attached to the feed table 14. The ratchet lever 29 is pivotally mounted on front shaft 22. The arm of spring lever 27 is held in spring loaded attachment to a lug of ratchet lever 29 by the force of compression spring 33 held thereon.

A trip lever 34 is momentarily raised as the push rods 19 make contact in their course of travel and being rigidly secured to a trip shaft 35 mounted in rotatable manner in journals in rear bearing posts 25 motion is transmitted to catch lever 36 likewise rigidly secured to the trip shaft 35. The motion of catch lever 36 will be in a direction away from catch 37, allowing this member and attached operating lever 38 pivotally mounted on pivot block 39 to drop. Fig. 2 illustrates the extreme position of travel of catch lever 36. The dropping of the operating lever 38 at the point of attachment of the catch 37 will raise a press control rod 40 on the opposite side of pivot block 39, stopping the motion of the ram 12 by suitable means.

The reciprocating motion of ram 12 and attached cutter 41, along with the synchronically actuated motion of push rods 19, is thus brought to a standstill until such a time as the operator desires to place additional plastic sticks 17 before the push rods 19 and start the cutting operation. The catch 37 is raised into a position of engagement with the catch lever 36 at the discretion of the operator, thus bringing the press control rod 40 into operating position. The operating lever 38 is limited in its vertical travel and horizontal movement is prevented by guide 42.

Guide posts 43 aid in mantaining correct alignment of the reciprocating upper platen 31 and attached cutter 41 with the side of die 18. The cutting edge of cutter 41 operates with optimum clearance along the face of die 18. A chute 44 guides the sliced plastic material into a catch box 45. Feed table 14 and attached mechanism are supported at the outer extremity by a support 46.

Figure 4:
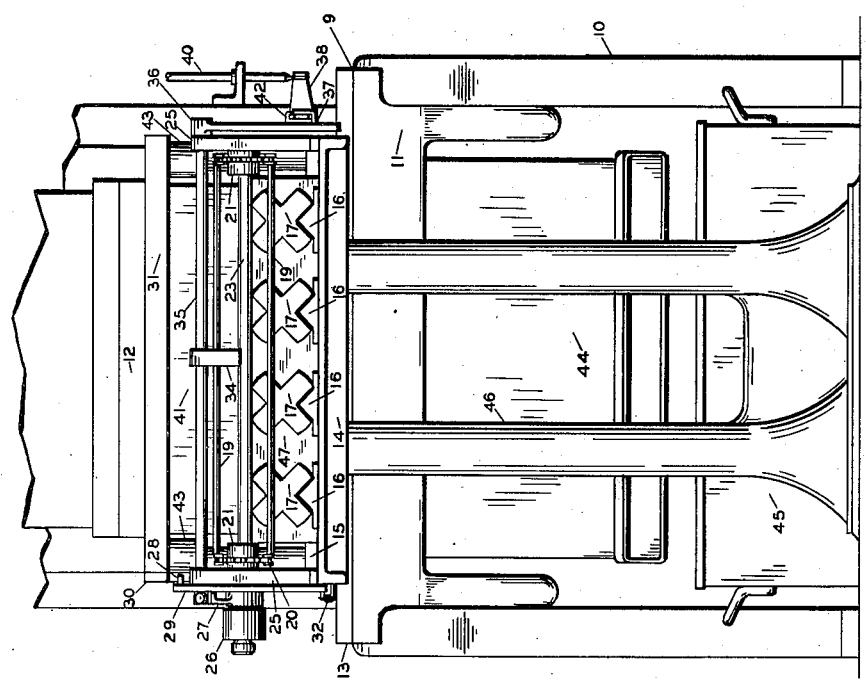
Fig. 4 is an end elevation as viewed from the right of another embodiment of the invention having a capacity for a plurality of plastic bars.

Another embodiment of the invention is shown in Fig. 4 which illustrates the adaptability of the invention for cutting a plurality of sticks. In order to accommodate a plurality of sticks, the number of guide bars 16 has been increased to correspond with the number of sticks being cut at one time. An enlarged die 47 is of such length as to contain an increased number of openings to accommodate the plurality of sticks, and other parts similar in design and function to those described in the preferred embodiment of the invention have been suitably lengthened or enlarged. The die 47 and guide bars 16 are shown, as in the preferred embodiment, to be of a design to accommodate cruciform plastic sticks. However, sticks having other configurations in cross section may be expeditiously cut, providing the die is constructed to accommodate such configurations. The operation of the embodiment of the invention as shown in Fig. 4 is substantially similar to that of the preferred embodiment heretofore described.

Referring to the drawings, the various features of the present invention have been shown embodied in a mechanical press, but it will be understood that certain features are not limited to use in mechanical presses but are useful in other types of presses, such as hydraulic or oildraulic.

The preferred embodiment of the invention, as described above, has been found to perform very satisfactorily in the cutting of cruciform smokeless powder sticks. The resultant slices were found to be negligibly deformed and of uniform thickness. In loading the machine, sticks were laid upon the feed table and guide bar by the operator. The powder sticks being of irregular lengths, a sufficient number of sticks were laid end to end extending from the die to the push rod to take full advantage of the travel of said push rods before the cutting and feeding operations were started by the operator.

This invention has distinct advantages, one being the cutting of preformed plastic bars without appreciable deformation. Still another advantage is the ability to load irregular length bars, it being possible to load a number of short plastic bars on the guide bar and obtain results comparable with those obtained in the use of long plastic bars. Since plastic bars manufactured by extrusion methods are often of great length, it can readily be seen that this machine is of infinite value in the cutting of this material. Moreover, in the cutting of plastic materials of a hazardous nature, such as smokeless powder, the automatic features of the machine may be employed to enable the operator to assume a position of safety during the cutting operation.

What I claim and desire to protect by Letters Patent is:

1. In a cutting machine having a work support and a cutter support the combination of a cutter for cutting at least one preformed plastic stick, a stick holding means, cutter actuating means, means for incrementally advancing the stick in synchronism with the cutter actuating means, means for automatically stopping the actuation of the cutter as the end of the stick is approached, and manual means for starting the actuation of the cutter.

2. The cutting machine according to claim 1 wherein said means for incrementally advancing the stick includes a push bar supported between parallel strands of endless chain mounted on sprockets and advanced incrementally behind the preformed plastic stick by indexing mechanism applied to a sprocket shaft and deriving movement from a cam mounted on the cutter actuating means.

3. The cutting machine according to claim 1 wherein said cutter actuating means includes a press with a vertically reciprocating ram forming a cutter support and a bolster plate forming a continuation of the work support.

4. In a cutting machine having a work support and a cutter support the combination of a cutter for cutting at least one cruciform smokeless powder stick, a stick holding means, cutter actuating means, means for incrementally advancing the stick in synchronism with the cutter actuating means, means for automatically stopping the actuation of the cutter as the end of the stick is approached, and manual means for starting the actuation of the cutter.

5. The cutting machine according to claim 6 wherein said means for incrementally advancing the cruciform smokeless powder stick includes a push bar behind the stick, said bar being supported between parallel strands of endless chain mounted on sprockets and advanced incrementally by indexing mechanism applied to a sprocket shaft and deriving movement from a cam mounted on the cutter actuating means.

6. In a cutting machine having a work support with at least one guide strip adapted to guide a cruciform plastic stick the combination of a power press with a single blade cutter rigidly attached to the ram, a die adapted to guide and hold at least one cruciform plastic stick while being cut, said die being adjacent to the path of travel of the cutter, at least one push bar supported between parallel strands of endless chain advanced incrementally behind the cruciform plastic stick to push said stick forward in synchronism with the actuation of the cutter, means for stopping the actuation of the cutter and in turn the push bar as the end of the cruciform plastic stick is approached, and manual means for starting the actuation of the cutter and push bar.

7. In a cutting machine having a work support with a plurality of guide strips adapted to guide a plurality of cruciform plastic sticks the combination of a power press with a single blade cutter rigidly attached to the ram, a die adapted to guide and hold a plurality of plastic sticks while being cut, said die being adjacent to the path of travel of the cutter, at least one push bar supported between parallel strands of endless chain advanced incrementally behind the cruciform plastic sticks to push said sticks forward in synchronism with the actuation of the cutter, means for stopping the actuation of the cutter and in turn the push bar as the ends of the cruciform plastic sticks are approached, and manual means for starting the actuation of the cutter and push bar.

JOSEPH STUART, II.

REFERENCES CITED

The following references are of record in the file of this patent:

UNITED STATES PATENTS

| Number | Name | Date |
|---|---|---|
| 2,209,412 | Lupo | July 30, 1940 |